US009856649B1

(12) United States Patent
Selway (10) Patent No.: US 9,856,649 B1
(45) Date of Patent: Jan. 2, 2018

(54) PROCESS FOR MANUFACTURING A MULTI-LAYER SHINGLE (71) Applicant: BUILDING MATERIALS INVESTMENT CORPORATION, Dallas, TX (US)

(72) Inventor: Harlan Selway, Huntington Beach, CA (US)

(73) Assignee: Building Materials Investment Corporation, Dallas, TX (US)

(*) Notice: Subject to any disclaimer, the term of this patent is extended or adjusted under 35 U.S.C. 154(b) by 0 days.

(21) Appl. No.: 14/837,456

(22) Filed: Aug. 27, 2015

(51) Int. Cl.
*B32B 37/02* (2006.01)
*B32B 38/04* (2006.01)
*B32B 7/12* (2006.01)
*E04D 1/26* (2006.01)
*E04D 1/12* (2006.01)
*E04D 1/28* (2006.01)
*B32B 38/00* (2006.01)
*B32B 5/22* (2006.01)

(52) U.S. Cl.
CPC ............... *E04D 1/26* (2013.01); *B32B 7/12* (2013.01); *B32B 37/02* (2013.01); *B32B 38/0004* (2013.01); *E04D 1/28* (2013.01); *B32B 5/22* (2013.01); *B32B 2419/06* (2013.01)

(58) Field of Classification Search
CPC . B32B 37/0046; B32B 37/02; B32B 37/1284; B32B 38/0004; B32B 38/045; B32B 38/18; B32B 38/1808; B32B 7/12; B32B 5/22; B32B 2419/06; B29C 2793/0027; B29C 2793/0036; B29C 2793/0063; B29C 2793/0072; B29C 65/52; E04D 1/12; E04D 1/26; E04D 1/28; Y10S 83/92; Y10T 56/12; Y10T 56/17; Y10T 56/1739; Y10T 56/1798; Y10T 56/1069; Y10T 56/1075; Y10T 56/1087
See application file for complete search history.

(56) References Cited

U.S. PATENT DOCUMENTS 6,355,132 B1 * 3/2002 Becker ................ B32B 38/1808
156/260

* cited by examiner

*Primary Examiner* — Linda L Gray
(74) *Attorney, Agent, or Firm* — Baker & McKenzie LLP (57) ABSTRACT In an exemplary embodiment, a shingle manufacturing system comprises an entry pull roll for providing a substantially continuous sheet comprising shingle material, an adhesive applicator for applying a laminating adhesive to a surface of the sheet, and a cutting station for cutting the sheet, now carrying the laminating adhesive, into at least three longitudinal pieces.

8 Claims, 5 Drawing Sheets

PROCESS FOR MANUFACTURING A MULTI-LAYER SHINGLE

TECHNICAL FIELD

The present disclosure relates generally to roofing shingles and more specifically to apparatus and methods for manufacturing same and products comprising same.

BACKGROUND

Multi-layered roofing shingles, compared to those having a single-layer may not only be better looking due to their thicker profile but also may be more durable and weatherproof. For many years the roofing industry has attempted to fabricate multi-layer shingles, but the resulting techniques all have drawbacks. For example, if a main sheet of shingle material is first separated into several long strips, adhesive applied to some of the strips, and the strips vertically stacked and laminated or adhered together, it may be necessary to use two self-contained individual laminators or to twist some of the strips upside down. This may be inefficient and undesirable in that it complicates the manufacturing process (e.g., increasing the risk of adhesive sticking to unwanted surfaces).

SUMMARY

Accordingly, a need has arisen for improved systems and methods of making multi-layer shingles. The present disclosure relates, in some embodiments, to systems and methods capable of forming multi-layered shingles without twisting any strips of shingle sheet prior to lamination and/or capable of forming multi-layered shingles with a single adhesive applicator or laminator.

The present disclosure relates, in some embodiments, to apparatuses for manufacturing multi-layer shingles. An apparatus may comprise an entry pull roll configured to provide a substantially continuous sheet comprising shingle material, an adhesive applicator configured to apply a laminating adhesive to a surface of the sheet, and a cutting station configured to cut the sheet, into at least three longitudinal pieces, wherein at least two of the sheets comprise the adhesive.

In some embodiments, an adhesive applicator (e.g., a dual adhesive applicator) may be configured to apply at least two separate strips of a laminating adhesive longitudinally to a bottom surface of a shingle sheet. Adhesive strips may comprise, for example, a first adhesive strip proximal to a longitudinal axis of a sheet and a second adhesive strip distal to the longitudinal axis of the sheet, wherein both the first and second strips are generally parallel (e.g., parallel) to the longitudinal axis of the sheet. A cutting station may comprise at least one dual slitter configured to cut a sheet along lines (e.g., substantially straight lines) along a longitudinal axis of a sheet. After cutting, longitudinal shingle pieces may comprise a first piece having the first adhesive strip, a second piece having the second adhesive strip, and a third piece. In a transverse direction, a first piece may be wider than a second piece, which in turn may be wider than a third piece.

In some embodiments, an apparatus may comprise a combining section configured to: position a second longitudinal shingle piece beneath a first longitudinal shingle piece (e.g., in alignment with the first adhesive strip on the first piece); contact (e.g., adhere) the second piece to a bottom surface of the first piece using the first adhesive strip; position a third longitudinal shingle piece beneath the second piece (e.g., in alignment with the second adhesive strip on the second piece); and contact (e.g., adhere) the third piece to a bottom surface of the second piece using the second adhesive strip. Contacting (e.g., adhering) first, second, and third pieces with each other may form a laminated shingle blank that is at least three layers thick along its longitudinal axis.

In some embodiments, an apparatus may comprise a shingle cutter configured to: cut out interdigitated tabs about a longitudinal center of a laminated shingle blank; and/or cut, along a transverse direction, the laminated shingle blank into individual multi-layer shingles. Interdigitated tabs may have substantially identical dimensions across all layers of a laminated shingle blank.

The present disclosure relates, in some embodiments, to methods for manufacturing multi-layer shingles. A method may comprise, for example, applying a laminating adhesive to a sheet of shingle material; and cutting the sheet having the laminating adhesive into a plurality of longitudinal pieces at the same time as and/or after applying the laminating adhesive.

In some embodiments, a laminating adhesive is applied to a first surface (e.g., a bottom surface) of a sheet in the form of at least two strips along (e.g., parallel or substantially parallel to) a longitudinal axis of the sheet. Adhesive strips may comprise, for example, a center adhesive strip proximal to the longitudinal axis of a sheet and an outer adhesive strip distal to the longitudinal axis of the sheet, wherein both the first and second strips are generally parallel (e.g., parallel) to the longitudinal axis of the sheet. A plurality of longitudinal pieces may comprise a first piece carrying a center adhesive strip, a second piece carrying an outer adhesive strip, and a third piece. In a transverse direction, a first piece may be wider than a second piece, which in turn may be wider than a third piece.

In some embodiments, a method may comprise laminating first and second longitudinal shingle pieces together by positioning the second piece beneath the first piece and adhering the second piece to a bottom surface of the first piece using the center adhesive strip. A method may comprise laminating second and third pieces together by positioning the third piece beneath the second piece and adhering the third piece to a bottom surface of the second piece using the outer adhesive strip. In some embodiments, laminating first, second, and third pieces together comprises aligning longitudinal centers of the first, second, and third pieces to be substantially on one vertical plane. Contacting (e.g., adhering) first, second, and third pieces with each other may form a laminated shingle blank that is at least three layers thick along its longitudinal center. First, second, and third pieces may represent top, intermediate, and bottom layers of the laminated shingle blank, respectively.

In some embodiments, cutting a sheet comprises positioning an area of a laminating adhesive below longitudinal gaps on a cutting station to prevent the laminating adhesive from sticking to any other surface during the cutting. Cutting may proceed along lines (e.g., substantially straight lines) along (e.g., parallel or substantially parallel to) a longitudinal axis of a sheet.

A plurality of longitudinal shingle pieces may comprise, according to some embodiments, a first shingle piece and a second shingle piece. A bottom surface of a first shingle piece may carry at least a portion of a laminating adhesive. A method may comprise stacking a second shingle piece below a first shingle piece and laminating the second shingle piece to the bottom surface of the first shingle piece where at least part of a laminating adhesive is present.

In some embodiments, a method may comprise cutting out interdigitated tabs about a longitudinal center of a laminated shingle blank and/or cutting, in a transverse direction (e.g., generally perpendicular to the longitudinal axis), the laminated shingle blank into individual shingles. Interdigitated tabs may have substantially identical (e.g., identical) dimensions across the top, intermediate, and bottom layers.

The present disclosure relates, in some embodiments, to systems for preparing multi-layer shingles. A system may comprise, for example, means for providing a substantially continuous sheet of shingle material; means for longitudinally applying an adhesive to the sheet; means for cutting the sheet, carrying the adhesive, into a plurality of longitudinal pieces; means for stacking and laminating the plurality of longitudinal pieces together to produce a laminated shingle blank; and means for cutting out interdigitated tabs about a longitudinal center of the laminated shingle blank.

In some embodiments, an adhesive may be applied to a bottom surface of a sheet in at least two areas comprising a center adhesive area proximal to the longitudinal axis of the sheet and an outer adhesive area distal to the longitudinal axis of the sheet, wherein both the center adhesive area and outer adhesive area are generally parallel (e.g., parallel) to the longitudinal axis of the sheet. A plurality of longitudinal pieces may comprise a first shingle piece having a center adhesive area, a second shingle piece having an outer adhesive area, and a third shingle piece. In some embodiments, a first piece is transversely wider than a second piece, which in turn is transversely wider than a third piece.

BRIEF DESCRIPTION OF THE DRAWINGS

Some embodiments of the disclosure may be understood by referring, in part, to the present disclosure and the accompanying drawings, wherein.

DETAILED DESCRIPTION

The present disclosure relates, in some embodiments, to apparatus and systems for manufacturing a multi-layer (e.g., a trilaminate) shingle. A shingle manufacturing apparatus may comprise, for example, an entry pull roll, an adhesive applicator, a cutting station, a combining section, and a shingle cutter. An entry pull roll may be configured to feed a substantially continuous sheet (e.g., a continuous main sheet comprising shingle material) to an adhesive applicator. An adhesive applicator may be configured to apply a laminating adhesive to a surface of the main sheet. A cutting station may be configured to cut a main sheet having a laminating adhesive into at least three longitudinal pieces, which comprises first, second, and third pieces of a shingle material. A combining section may be configured to position a second piece beneath a first piece, contact (e.g., adhere) the second piece to a bottom surface of the first piece (e.g., using the first adhesive strip), position a third piece beneath the second piece, and contact (e.g., adhere) the third piece to a bottom surface of the second piece (e.g., using the second adhesive strip). According to some embodiments, one sheet (e.g., a lower sheet or a bottom sheet) may be beneath another sheet (e.g., an upper sheet or a top sheet) if at least a portion of the upper sheet is co-extensive with the lower sheet and the lower sheet is closer to a roofing substrate or configured to be upon installation closer to a roofing substrate than the co-extensive portion of the second sheet. Contacting (e.g., adhering) first, second, and third pieces with each other may form a laminated shingle blank that is at least three layers thick along its longitudinal center axis. A shingle cutter may be configured to cut out interdigitated tabs about the longitudinal center axis of a laminated shingle blank. A shingle cutter may be configured to cut, along the transverse direction, a laminated shingle blank into individual multi-layer shingles.

According to some embodiments, a system for preparing multi-layer shingles may comprise: means for providing a substantially continuous sheet of shingle material; means for longitudinally applying an adhesive to the sheet; means for cutting the sheet having the adhesive into a plurality of longitudinal pieces; means for stacking and laminating the plurality of longitudinal pieces together to produce a laminated shingle blank; and means for cutting out interdigitated tabs about a longitudinal center axis of the laminated shingle blank. In some embodiments, longitudinal pieces of a shingle material may comprise a first piece having a center adhesive strip, a second piece having an outer adhesive strip, and a third piece, the third piece optionally not having any laminating adhesive on its bottom surface. In a transverse direction (e.g., generally perpendicular to a longitudinal axis), a first piece may be wider than a second piece, which in turn may be wider than a third piece.

The present disclosure also relates, in some embodiments, to methods of manufacturing a multi-layer (e.g., a trilaminate) shingle. A method may comprise applying (e.g., longitudinally applying) an adhesive (e.g., a laminating adhesive) to a first surface (e.g., a bottom surface) of a main sheet. For example, an adhesive may be applied in one or more strips (e.g., two separate strips, three separate strips, or multiple separate strips). An adhesive strip may be positioned in any desired location. For example, a first strip may be positioned on a first surface (e.g., a bottom surface) along a longitudinal axis (e.g., central lengthwise axis) of a sheet. For example, a center adhesive strip may be positioned along a bottom center of a main sheet. An adhesive strip may be positioned, according to some embodiments, on a first surface (e.g., a bottom surface) generally parallel to and spaced apart from a longitudinal axis of a sheet. For example, an adhesive strip (e.g., an outer adhesive strip) may be positioned closer to a first edge of a main sheet. A second surface of a sheet opposite the first surface (e.g., a top surface) may be free of adhesive at least up to separating the sheet (e.g., cutting the sheet into shingles).

The present disclosure relates, in some embodiments, to methods, systems, and apparatuses for manufacturing a multi-layered shingle. A method may comprise, for example, applying an adhesive on a first surface of a main sheet (e.g., a sheet comprising a bituminous material) and then separating (e.g., cutting) the main sheet. In some embodiments, a manufacturing process may comprise feeding a main sheet to a dual laminate applicator, applying with an applicator multiple (e.g., two) longitudinal strips of adhesive (e.g., laminating adhesive) to a first surface (e.g., the bottom surface) of the sheet. A first adhesive strip may be positioned on a first surface (e.g., the bottom surface) proximal to a longitudinal axis of a sheet (e.g., along the central longitudinal axis). A second adhesive strip may be positioned distal to a longitudinal axis (e.g., closer to a lengthwise edge of a sheet than its central longitudinal axis and/or generally parallel to and spaced apart from a central longitudinal axis). Following adhesive application, a method may comprise cutting and separating a main sheet (e.g., with a cutting station) into three longitudinal pieces. A first piece may include all or substantially all of a first center adhesive strip, while a second piece may include all or substantially all of a second outer adhesive strip. A method may comprise (e.g., after longitudinal cutting) vertically laminating three pieces of shingle material together. For example, three longitudinal pieces may be stacked, aligned, and then adhered together (e.g., at a combination station) to form three layers of a laminated shingle blank. To reduce or even eliminate the chance for cracking a top surface of a shingle, a top layer may be made wider than an intermediate layer, which in turn made wider than a bottom layer. A method may comprise (e.g., after forming a laminated shingle blank) cutting out interdigitated tabs generally about a longitudinal axis of a laminated shingle blank, and/or separating a laminated shingle blank into two parts (e.g., shingles). A method may comprise cutting two parts of a laminated shingle blank along a transverse direction to produce individual multi-layer shingles of a predetermined length.

In some embodiments, a shingle manufacturing system or apparatus may comprise an entry pull roll, an adhesive applicator, a cutting station, a steering station, a combining section, and a shingle cutter. An entry pull roll may be configured to feed a substantially continuous sheet (e.g., a continuous main sheet comprising shingle material) to an adhesive applicator. An adhesive applicator may be configured to apply a laminating adhesive to a surface of the main sheet. A cutting station may be configured to cut a main sheet, now carrying the laminating adhesive, into at least three longitudinal pieces, which comprises first, second, and third pieces of a shingle material. A steering station and a combining section may be configured to position the second piece beneath the first piece, adhere the second piece to a bottom surface of the first piece using the first adhesive strip, position the third piece beneath the second piece using a steering station, a combining section, thereby adhering the third piece to a bottom surface of the second piece using the second adhesive strip. Adhering first, second, and third pieces may result in a laminated shingle blank that is at least three layers thick along its longitudinal center axis. A shingle cutter may be configured to cut out interdigitated tabs about the longitudinal center axis of a laminated shingle blank. A shingle cutter may be configured to cut, along the transverse direction, a laminated shingle blank into individual multi-layer shingles.

Figure 1A:
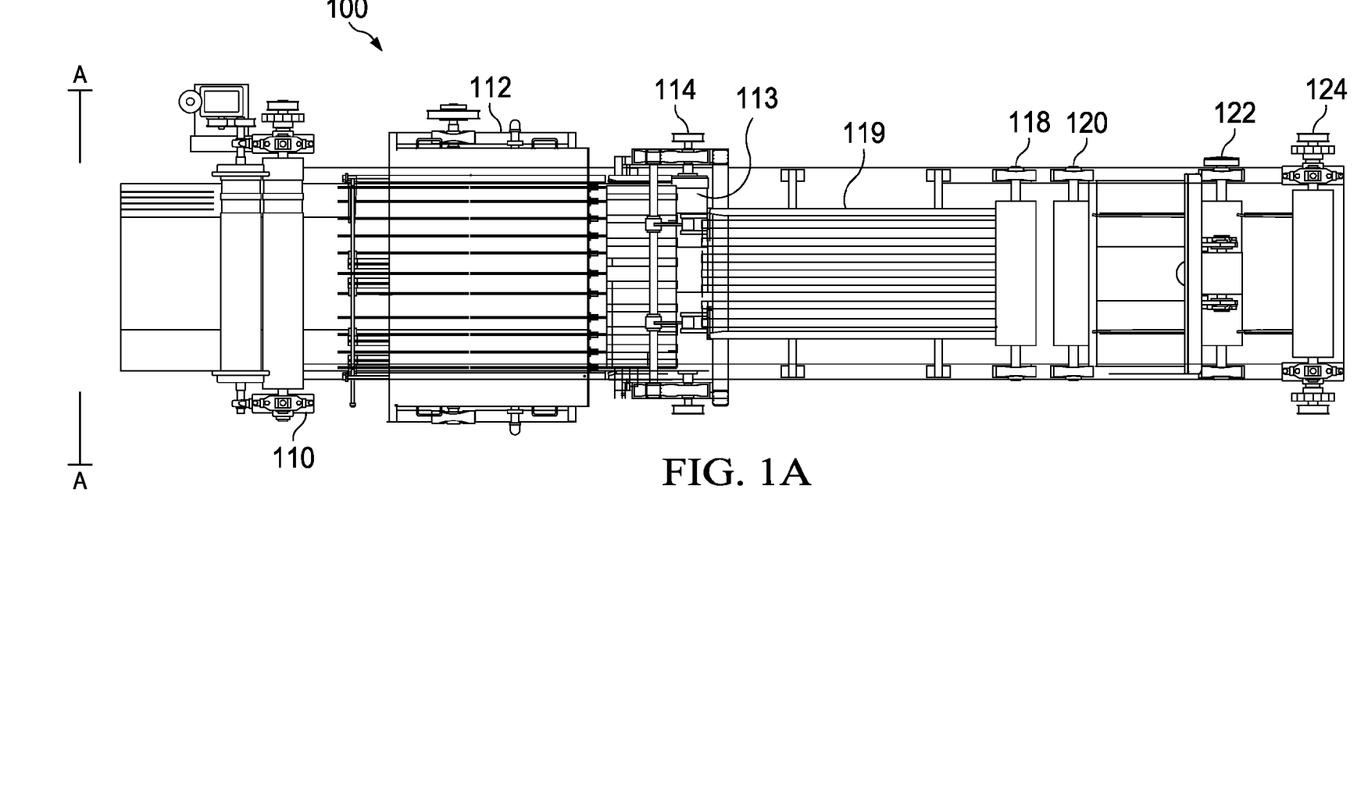
FIG. 1A is a top view of a shingle manufacturing system in accordance with a specific example embodiment of the disclosure.
Figure 1B:
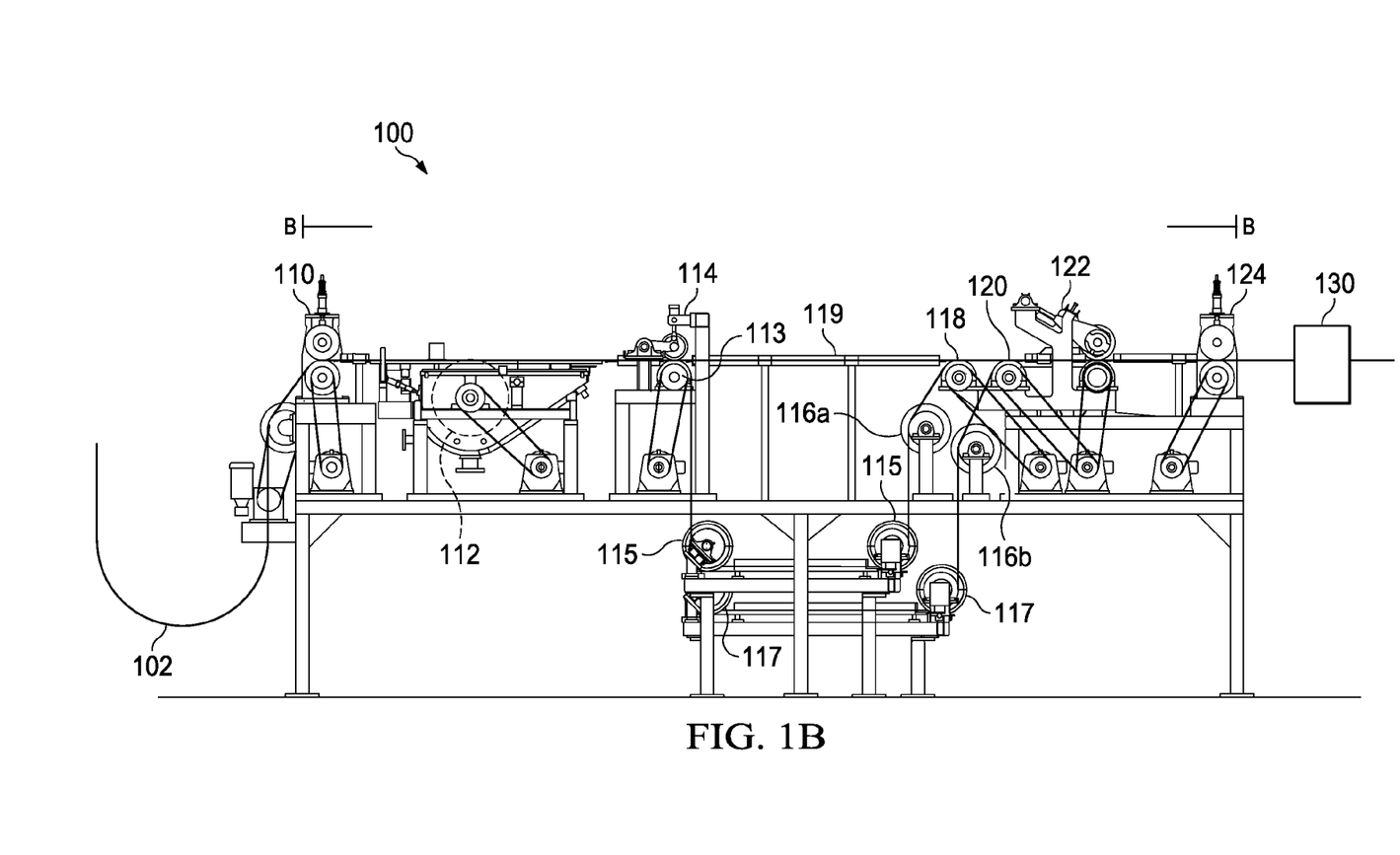
FIG. 1B is a front side view of the system shown in FIG. 1A.

FIG. 1A illustrates a top view of shingle manufacturing system 100, and FIG. 1B illustrates a front side view of system 100. System 100 may be configured to receive main sheet 102 of shingle material and fabricate shingles therefrom. System 100 may comprise entry pull roll 110, adhesive applicator 112, cutting station 114, first steering bridge 115, second steering bridge 117, first steering roll 116a, second steering roll 116b, slotted guide tray 119, first guide roll 118, second guide roll 120, combining press roll 122, and exit pull roll 124. Optionally, other parts such as granule applicator, although not shown in figures, may be used wherever appropriate. For example, shingle cutter 130 may be coupled to system 100 or may be included in system 100.

According to an example embodiment of operation, entry pull roll 110 may receive main sheet 102. Main sheet 102 may be a substantially continuous sheet of shingle material comprising any suitable content, such as asphalt, granules, and other materials. Main sheet 102 may be infinitely long. Then entry pull roll 110 may feed main sheet 102 to adhesive applicator 112, which may apply, along a longitudinal axis of main sheet 102, a laminating adhesive to a surface of main sheet 102. For example, adhesive applicator 112 may be a dual adhesive applicator that applies two or two groups of adhesive strips 104 and 106 to the bottom (or top) surface of main sheet 102. Adhesive applicator 112 may contain a laminating adhesives in a tray. Compared to other approaches of applying laminating adhesive after slitting main sheet 102, a potential advantage of the disclosed approach is that only one laminating adhesive applicator may be needed to apply adhesive to multiple sites (e.g., parallel strips) on a surface of main sheet 102 at the same time, thereby simplifying the manufacturing process and saving cost.

A laminating adhesive may be used later to laminate together longitudinal shingle pieces. In some embodiments, the laminating adhesive may be a modified asphalt comprising asphalt and polymer additives such as plasticizer(s). Thus, ingredients or components of the laminating adhesive may sometimes be different from certain adhesives used for sealing, granule application, and other purposes. For instance, adhesives comprising coating asphalt, with no plasticizers or other suitable additives, may not be suitable for lamination purposes. Applying one of these other adhesives (e.g., an adhesive for binding granules to the shingle) before a main sheet is cut into strips, according to some embodiments at least, is a process separate from applying a laminating adhesive. For instance, applying granule-binding adhesive may not reduce or eliminate the need to twist the strips upside down prior to lamination.

Figure 2A:
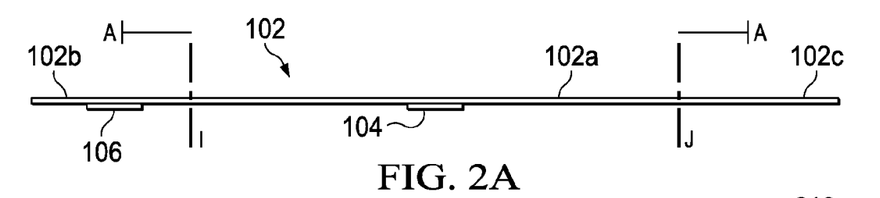
FIG. 2A is a left or right side view of a main sheet of shingle material that carries two adhesive strips in accordance with a specific example embodiment of the disclosure.

FIGS. 2A-2F illustrate schematic views of main sheet 102 at various stages, as main sheet 102 is processed by various parts of system 100. Thus, discussions with respect to FIGS. 1A-1B and 2A-2F are intermingled for coherence purposes. FIG. 2A shows a left or right side view of main sheet 102 as it carries first adhesive strip 104 and second adhesive strip 106. First adhesive strip 104 may be a center adhesive strip or adhesive area that is proximal to a longitudinal axis of main sheet 102 (e.g., along the bottom center), while second adhesive strip 106 may be an outer adhesive strip or adhesive area that is distal to the longitudinal axis of main sheet 102 (e.g., closer to a bottom edge of main sheet 102 than to the longitudinal axis and/or generally parallel to and spaced apart from the central longitudinal axis). Adhesive strips 104 and 106 may be separated by an uncoated or uncovered area or may be connected to form a wider strip. Although each of adhesive strips 104 and 106 is shown in FIG. 2A as a continuous strip in the transverse direction, in some embodiments, the area where adhesive strip 104 or 106 resides may comprise a group of narrower adhesive strips separated by longitudinal gaps (e.g., created by 6-8 wheels on adhesive applicator 112). Adhesive strips 104 and 106 may comprise any suitable adhesive material (e.g., modified asphalt) and may have any suitable width and/or thickness. For example, adhesive strips 104 and 106 may each be two inches wide, or each may comprise a group of narrow laminate strips. Adhesive strips 104 and 106 may be separated by a nineteen-inch spacing. Any number of adhesive strips may be applied by adhesive applicator 112.

After leaving adhesive applicator 112, main sheet 102, now carrying adhesive, may be cut by cutting station 114 into a plurality of separate, longitudinal pieces. Cutting may be in a longitudinal direction, along a longitudinal axis of main sheet 102, as indicated by B-B direction in FIG. 1B. For example, cutting station 114 may comprise a set (one or more) of dual slitters, which may longitudinally cut main sheet 102 along two substantially straight lines (at points I and J in FIG. 2A) into three longitudinal strips or pieces 102a, 102b, and 102c. Center adhesive strip 104 may stay on a first piece 102a, outer adhesive strip 106 may stay on a second piece 102b, and third piece 102c may not carry any adhesive. Cutting station 114 may comprise or be coupled to slotted roll 113, which may be located below a slitter and have slots separated by longitudinal gaps. The longitudinal gaps may be positioned right on top of adhesive strips 104 and 106 to prevent adhesive strips 104 and 106 from undesirably sticking to any surface during cutting. Accordingly, there is no need to tape protect adhesive strips 104 and 106.

Figure 2B:
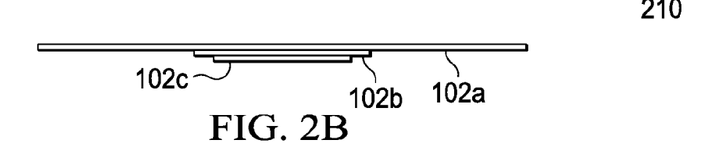
FIG. 2B is a side view of a laminated shingle blank in accordance with a specific example embodiment of the disclosure produced after processing the main sheet shown in FIG. 2A.
Figure 2C:
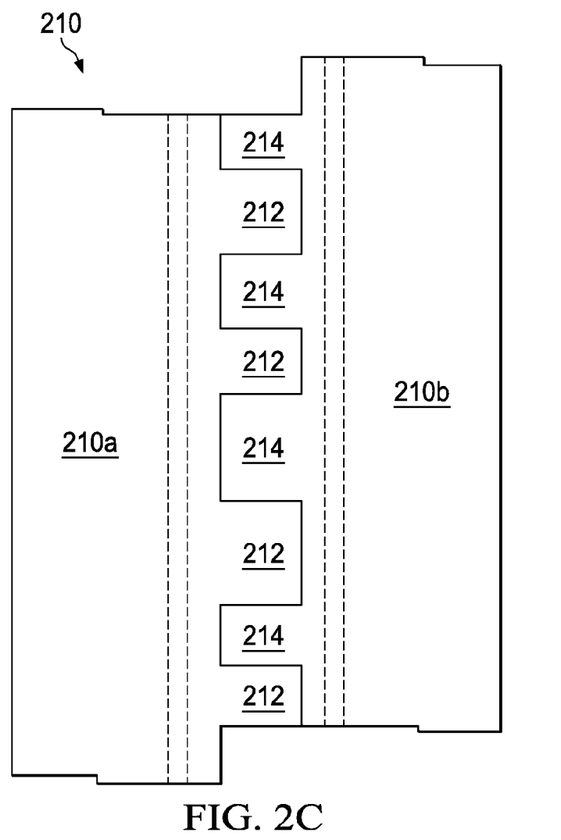
FIG. 2C is a top view of a laminated shingle blank, which is cut about its longitudinal center to generate interdigitated tabs in accordance with a specific example embodiment of the disclosure.
Figure 2D:
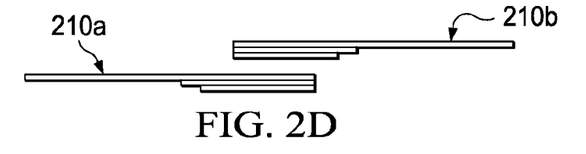
FIG. 2D is a side view of two halves of a laminated shingle blank after interdigitated tabs are cut on the laminated shingle blank in accordance with a specific example embodiment of the disclosure.
Figure 2E:
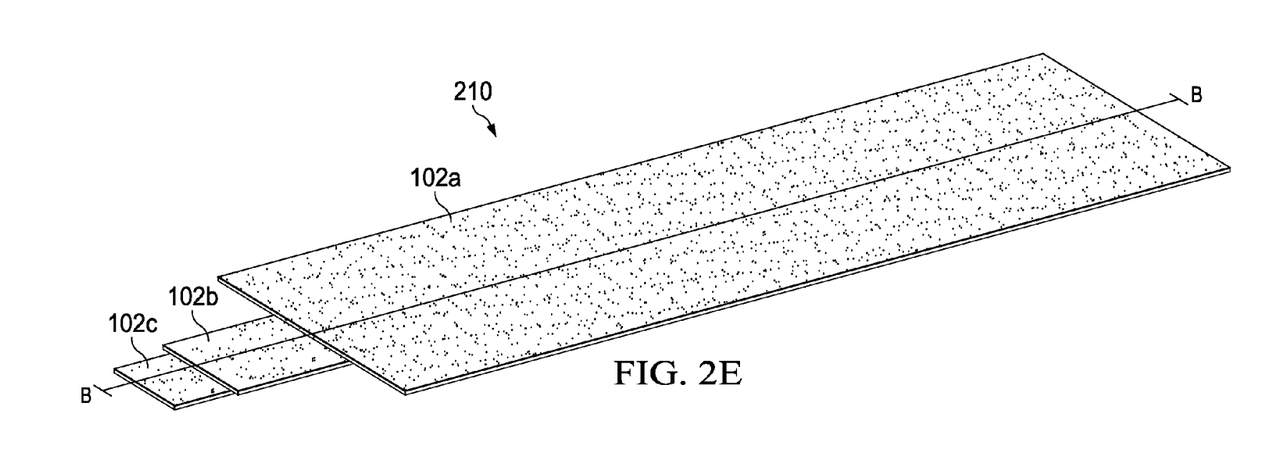
FIG. 2E is a perspective view of the laminated shingle blank shown in FIG. 2B.

In an example embodiment, in a transverse direction (A-A direction in FIGS. 1A and 2A), first piece 102a is wider than second piece 102b, which in turn is wider than third piece 102c, as shown in FIGS. 2B and 2E. For example, first piece 102a may be 29 and 3/8 inches wide, second piece 102b 10 and 5/8 inches wide, and third piece 102c 8 and 3/8 inches wide. Pieces 102a, 102b, and 102c will later form top, intermediate, and bottom layers of a multi-layer shingle, respectively. Different widths of shingle layers may help reduce or eliminate the chance of shingle cracking, e.g., when a person steps on the top surface of a shingle.

Following cutting station 114, pieces 102a, 102b, and 102c may be vertically laminated (e.g., stacked, aligned, and adhered) together using previously applied adhesive strips. In an example embodiment, slotted guide tray 119, comprising slots separated by longitudinal gaps, may transfer piece 102a from cutting station 114 to guide roll 118. Longitudinal gaps may prevent laminating adhesive on piece 102a from sticking onto an unwanted surface. On the other hand, steering bridge 115 may transfer piece 102b from cutting station 114 to guide roll 116a then to guide roll 118 and on to guide roll 120 and then to combining press roll 122. Steering bridge 117 may transfer 102c from cutting station 114 to guide roll 116b then to guide roll 120 and on to combining press roll 122. Guide rolls 118 and 120 may position piece 102b beneath piece 102a, as shown in FIGS. 2B and 2E. Pieces 102a and 102b may be vertically aligned such that their longitudinal axis's substantially locate on the same vertical plane. Then, piece 102b may be adhered to a bottom surface of piece 102a, e.g., by combing press roll 122, using adhesive strip 104. Similarly, guide roll 120 may position the piece 102c beneath piece 102b. Pieces 102b and 102c may be vertically aligned such that their longitudinal axis's substantially locate on the same vertical plane. Piece 102c may be adhered to a bottom surface of piece 102b using adhesive strip 106 and combining press roll 122. Pieces 102a, 102b, and 102c are not twisted, so no twisting may be needed during stacking and lamination, which simplifies the fabrication process.

As shown in FIGS. 2B and 2E, adhering pieces 102a, 102b, and 102c results in multi-layer laminated shingle blank 210 that is three layers thick along its longitudinal center. In an example embodiment, pieces 102a, 102b, and 102c may be laminated together such that they are substantially center-aligned (i.e., their longitudinal centers substantially locate on the same vertical plane). The center alignment may help generate two symmetrical sets of shingles in later steps. Slotted guide tray 119 and slotted roll 113 may be used to prevent adhesive strips 104 and 106 from sticking to, or coming in contact with, any surface before they are ready to be used in laminating together pieces 102a, 102b, and 102c.

Exit pull roll 124 may transfer laminated shingle blank 210 to shingle cutter 130, which may be part of system 100 or may be coupled to system 100. Shingle cutter 130 may be configured or operable to cut out interdigitated tabs about the longitudinal center of laminated shingle blank 210, as shown in FIG. 2C. Laminated shingle blank 210 may be cut and separated into two halves 210a and 210b, as shown in FIG. 2C (top view) and FIG. 2D (side view). The dotted lines in FIG. 2C represents edges of pieces 102b and 102c. After separation, half 210a may have interdigitated tabs 212, and half 210b may have interdigitated tabs 214.

Interdigitated tabs 212 and 214 may have any suitable width, length, and/or thickness. In an example embodiment, interdigitated tabs 212 and 214 have substantially identical dimensions across the top, intermediate, and bottom layers of halves 210a and 210b, respectively.

Figure 2F:
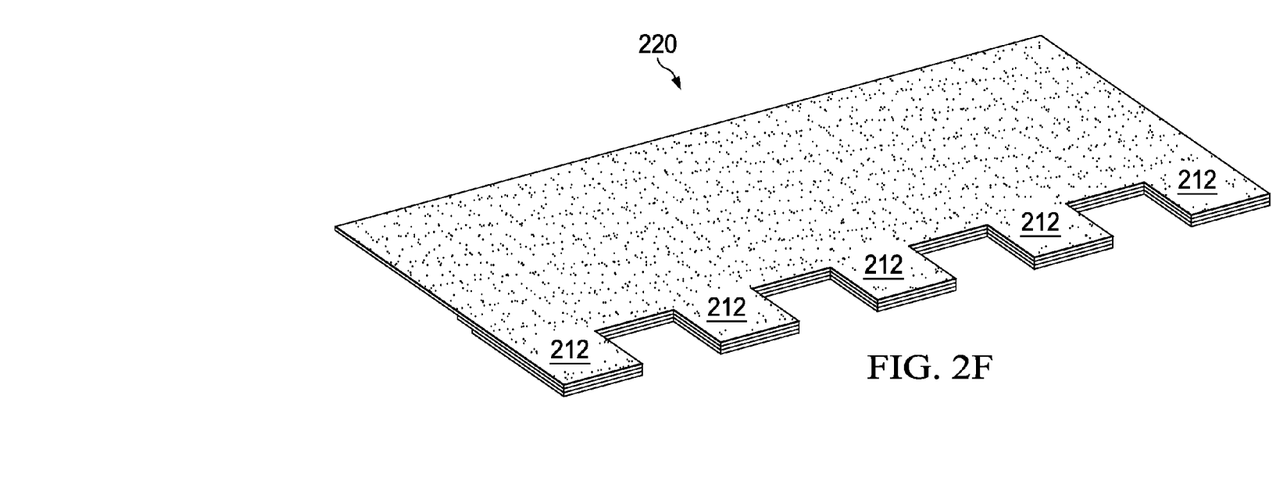
FIG. 2F is a perspective view of a in accordance with a specific example embodiment of the disclosure multi-layer shingle.

Moreover, each of halves 210a and 210b may be cut by shingle cutter 130, in a transverse direction, into individual tri-layer shingles. FIG. 2F shows a perspective view of exemplary multi-layer shingle 220, which may be manufactured using methods and processes disclosed herein. Shingle 220 may be cut from half 210a comprising tabs 212 (shown) or from 210b comprising tabs 214 (not shown). Thus, Shingle 220 may comprise part of shingle piece 102a, part of shingle piece 102b, and part of shingle piece 102c. Each shingle may have any predetermined length and/or width. In some embodiments, a shingle may be no more than 10 inches-long and 10 inches-wide. In other embodiments, a shingle may be no less than 40 inches-long and 40 inches-wide.

Figure 3:
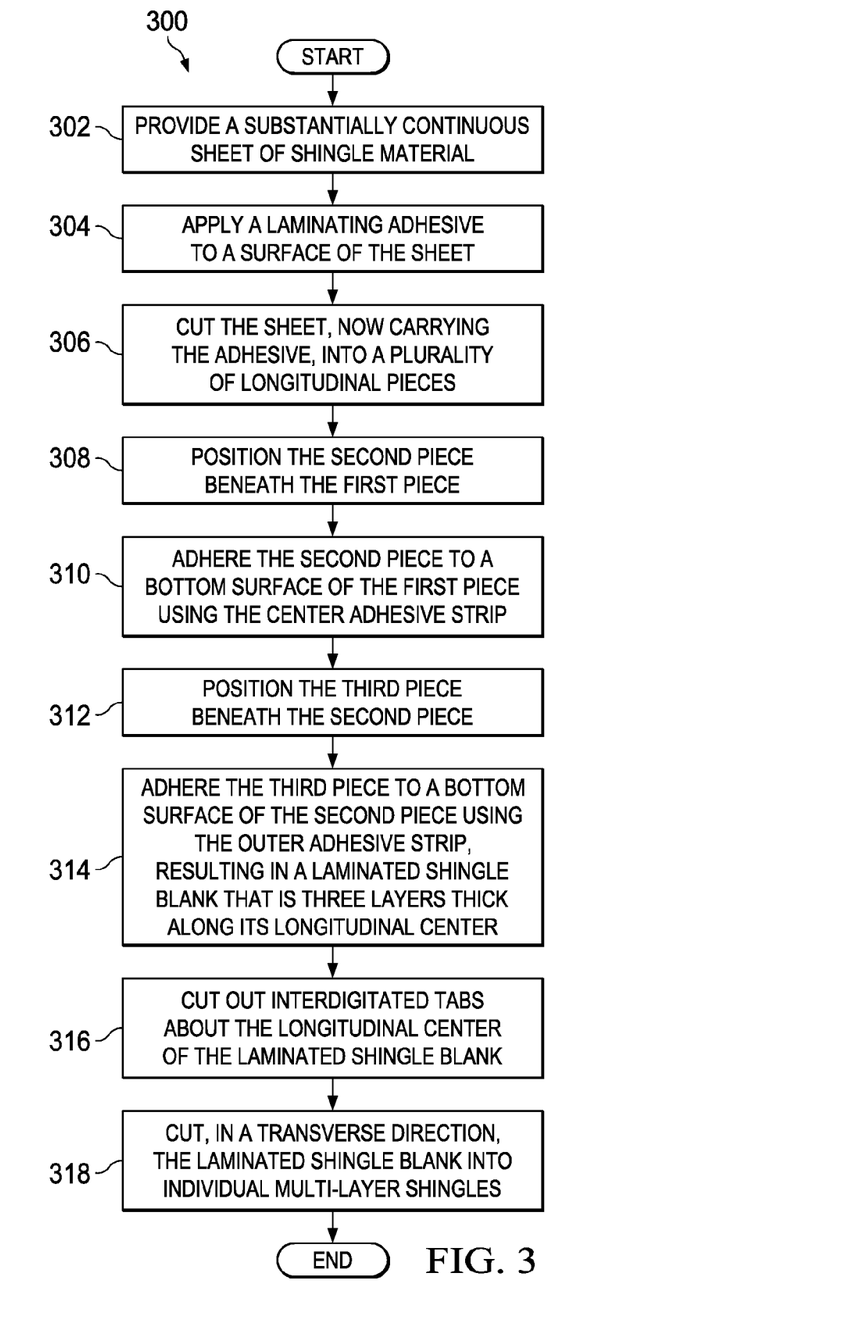
FIG. 3 is a flowchart showing a shingle manufacturing process in accordance with a specific example embodiment of the disclosure.

FIG. 3 is a flowchart showing an example embodiment of shingle manufacturing method or process 300, which may be implemented by a shingle manufacturing system (e.g., system 100). Process 300 may start in action 302, where an entry pull roll (e.g., entry pull roll 110) may provide a substantially continuous sheet of shingle material (e.g., main sheet 102). In action 304, an adhesive applicator (e.g., adhesive applicator 112) may apply a laminating adhesive to a surface of the sheet. In an example embodiment, the laminating adhesive may be longitudinally applied to a bottom surface of the sheet as at least two strips. The strips may comprise a center adhesive strip (e.g., adhesive strip 104) and an outer adhesive strip (e.g., adhesive strip 106).

In action 306, a cutting station (e.g., cutting station 114) may cut or slit a sheet, now carrying the adhesive, into a plurality of longitudinal pieces at the same time as and/or after adhesive application in action 304. A sheet may be cut following substantially straight lines along a longitudinal axis of the sheet (i.e., in longitudinal direction B-B). In an example embodiment, the plurality of longitudinal pieces comprises: a first piece (e.g., piece 102a) carrying the center adhesive strip; a second piece (e.g., piece 102b) carrying the outer adhesive strip; and a third piece (e.g., piece 102c) not carrying any adhesive. In a transverse direction, the first piece may be wider than the second piece, which in turn may be wider than the third piece.

In action 308, a combining section of the manufacturing system (e.g., a laminator comprising steering bridge or station 115, guide roll 116a, guide roll 118, guide roll 120, and combining press roll 122) may position the second piece beneath the first piece. In action 310, the combining section may laminate or adhere the second piece to a bottom surface of the first piece using the center adhesive strip. Similarly, in action 312, the combining section (e.g., a laminator comprising steering bridge or station 117, guide roll 116b, guide roll 120, and combining press role 122) may position the third piece beneath the second piece. In action 314, the combining section may adhere the third piece to a bottom surface of the second piece using the outer adhesive strip. In an example embodiment shown in FIG. 2C, the first, second, and third pieces are substantially center-aligned as a result of being adhered together. Adhering the first, second, and third pieces results in a laminated shingle blank that is three layers thick along its longitudinal center. The first, second, and third pieces may later represent top, intermediate, and bottom layers of the laminated shingle blank, respectively.

In action 316, a shingle cutter may cut out interdigitated tabs about the longitudinal center of the laminated shingle blank. In an example embodiment, the interdigitated tabs have substantially identical dimensions across the top, intermediate, and bottom layers. In action 318, the same shingle cutter (or another cutter known to one of ordinary skill in the art) may cut, in a transverse direction, the laminated shingle blank into individual multi-layer shingles.

As will be understood by those skilled in the art who have the benefit of the instant disclosure, other equivalent or alternative compositions, devices, methods, and systems for manufacturing multi-layer shingles can be envisioned without departing from the description contained herein. Accordingly, the manner of carrying out the disclosure as shown and described is to be construed as illustrative only. For example, although the discussion herein mainly uses the fabrication of tri-layer shingles as an example, the principles and spirits taught by the present disclosure can be readily applied to any other number of shingle layers. As one example, a double-layer shingle can be made if main sheet 102 is coated with one adhesive strip, and then cut into two (instead of three) pieces. As another example, a quadruple-layer shingle can be made if main sheet 102 is coated with three adhesive strips, and then cut into four longitudinal pieces.

Persons skilled in the art may make various changes in the nature, number, and/or arrangement of parts or steps without departing from the scope of the instant disclosure. For example, the size of a device and/or system may be scaled up or down to suit the needs and/or desires of a practitioner. Each disclosed method and method step may be performed in association with any other disclosed method or method step and in any order according to some embodiments. Where the verb "may" appears, it is intended to convey an optional and/or permissive condition, but its use is not intended to suggest any lack of operability unless otherwise indicated. Where open terms such as "having" or "comprising" are used, one of ordinary skill in the art having the benefit of the instant disclosure will appreciate that the disclosed features or steps optionally may be combined with additional features or steps. Such option may not be exercised and, indeed, in some embodiments, disclosed systems, compositions, apparatuses, and/or methods may exclude any other features or steps beyond those disclosed herein. Elements, compositions, devices, systems, methods, and method steps not recited may be included or excluded as desired or required. Persons skilled in the art may make various changes in methods of preparing and using a composition, device, and/or system of the disclosure.

Also, where ranges have been provided, the disclosed endpoints may be treated as exact and/or approximations as desired or demanded by the particular embodiment. Where the endpoints are approximate, the degree of flexibility may vary in proportion to the order of magnitude of the range. For example, on one hand, a range endpoint of about 50 in the context of a range of about 5 to about 50 may include 50.5, but not 52.5 or 55 and, on the other hand, a range endpoint of about 50 in the context of a range of about 0.5 to about 50 may include 55, but not 60 or 75. In addition, it may be desirable, in some embodiments, to mix and match range endpoints. Also, in some embodiments, each figure disclosed (e.g., in one or more of the examples, tables, and/or drawings) may form the basis of a range (e.g., depicted value+/−about 10%, depicted value+/−about 50%, depicted value+/−about 100%) and/or a range endpoint. With respect to the former, a value of 50 depicted in an example, table, and/or drawing may form the basis of a range of, for example, about 45 to about 55, about 25 to about 100, and/or about 0 to about 100.

All or a portion of a device and/or system for drying systems of wet-laid fibrous nonwoven materials may be configured and arranged to be disposable, serviceable, interchangeable, and/or replaceable. These equivalents and alternatives along with obvious changes and modifications are intended to be included within the scope of the present disclosure. Accordingly, the foregoing disclosure is intended to be illustrative, but not limiting, of the scope of the disclosure as illustrated by the appended claims.

Headings (e.g., Title, Abstract, Background, Detailed Description) are provided in compliance with regulations and/or for the convenience of the reader. They do not include and should not be read to include definitive or over-arching admissions as to the scope and content of prior art or limitations applicable to all disclosed embodiments.

What is claimed is:

1. An apparatus for manufacturing multi-layer shingles, the apparatus comprising:
    an entry pull roll configured to provide a substantially continuous sheet comprising shingle material;
    an adhesive applicator configured to receive the sheet from the entry pull roll and to apply a laminating adhesive to a surface of the sheet;
    a cutting station configured to cut the sheet, carrying the laminating adhesive into at least a first piece, a second piece, and a third piece, each having a longitudinal center; and
    a combining section configured to (a) align the longitudinal centers of the first piece, the second piece, and the third piece in a single plane without twisting and (b) combine the first piece, the second piece, and the third piece without twisting.

2. The apparatus of claim 1, wherein the adhesive applicator is further configured to apply a first adhesive strip proximal to a longitudinal axis of the sheet and a second adhesive strip distal to the longitudinal axis of the sheet, wherein the longitudinal pieces comprises a first piece carrying the first adhesive strip, a second piece carrying the second adhesive strip, and a third piece, and wherein, in a transverse direction, the first piece is wider than the second piece, which in turn is wider than the third piece.

3. The apparatus of claim 2, further comprising a combining section configured to:
   position the second piece beneath the first piece;
   adhere the second piece to a bottom surface of the first piece using the first adhesive strip;
   position the third piece beneath the second piece; and
   adhere the third piece to a bottom surface of the second piece using the second adhesive strip,
   wherein adhering the first, second, and third pieces forms a laminated shingle blank that is at least three layers thick along its longitudinal axis.

4. The apparatus of claim 3, further comprising a shingle cutter configured to:
   cut out interdigitated tabs about the longitudinal center of the laminated shingle blank, the interdigitated tabs having substantially identical dimensions across the three layers of the laminated shingle blank; and
   cut, along the transverse direction, the laminated shingle blank into individual multi-layer shingles.

5. The apparatus of claim 1, wherein the adhesive applicator is a dual adhesive applicator, and wherein the cutting station comprises at least one dual slitter configured to cut the sheet following substantially straight lines along a longitudinal axis of the sheet.

6. The apparatus of claim 1, further comprising a slotted guide tray comprising at least one slot separated by at least one longitudinal gap.

7. The apparatus of claim 1, further comprising a steering bridge configured to transfer the first piece, the second piece, or the third piece from the cutting station to the combining section.

8. The apparatus of claim 1, wherein the combining section comprises a combining press roll and at least one guide roll.

* * * * *